No. 891,666. PATENTED JUNE 23, 1908.
B. F. BROWN.
TRAP.
APPLICATION FILED MAR. 26, 1908.
2 SHEETS—SHEET 1.
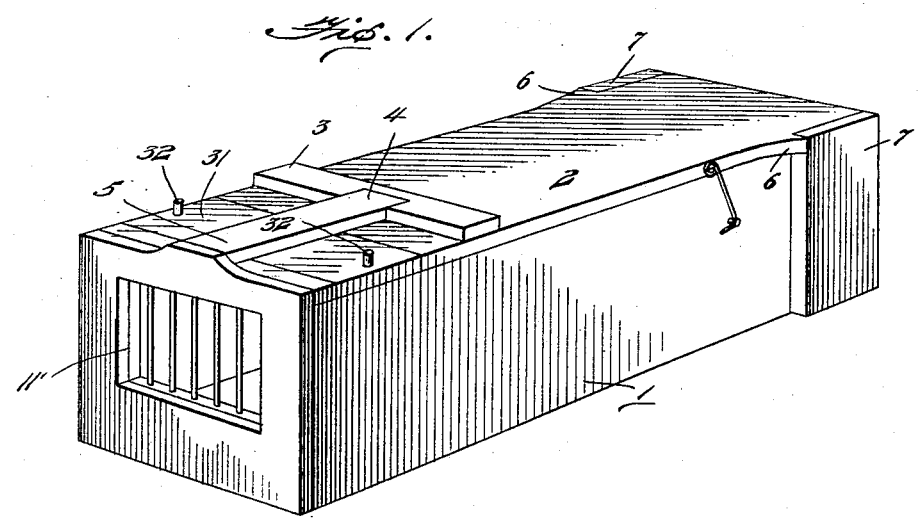
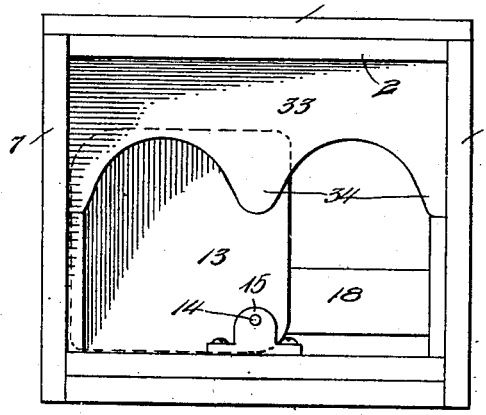 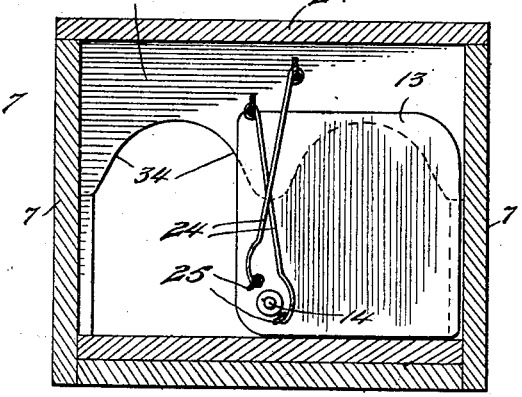
Witnesses
Inventor
B. F. Brown
By H. B. Willson & Co.
Attorneys

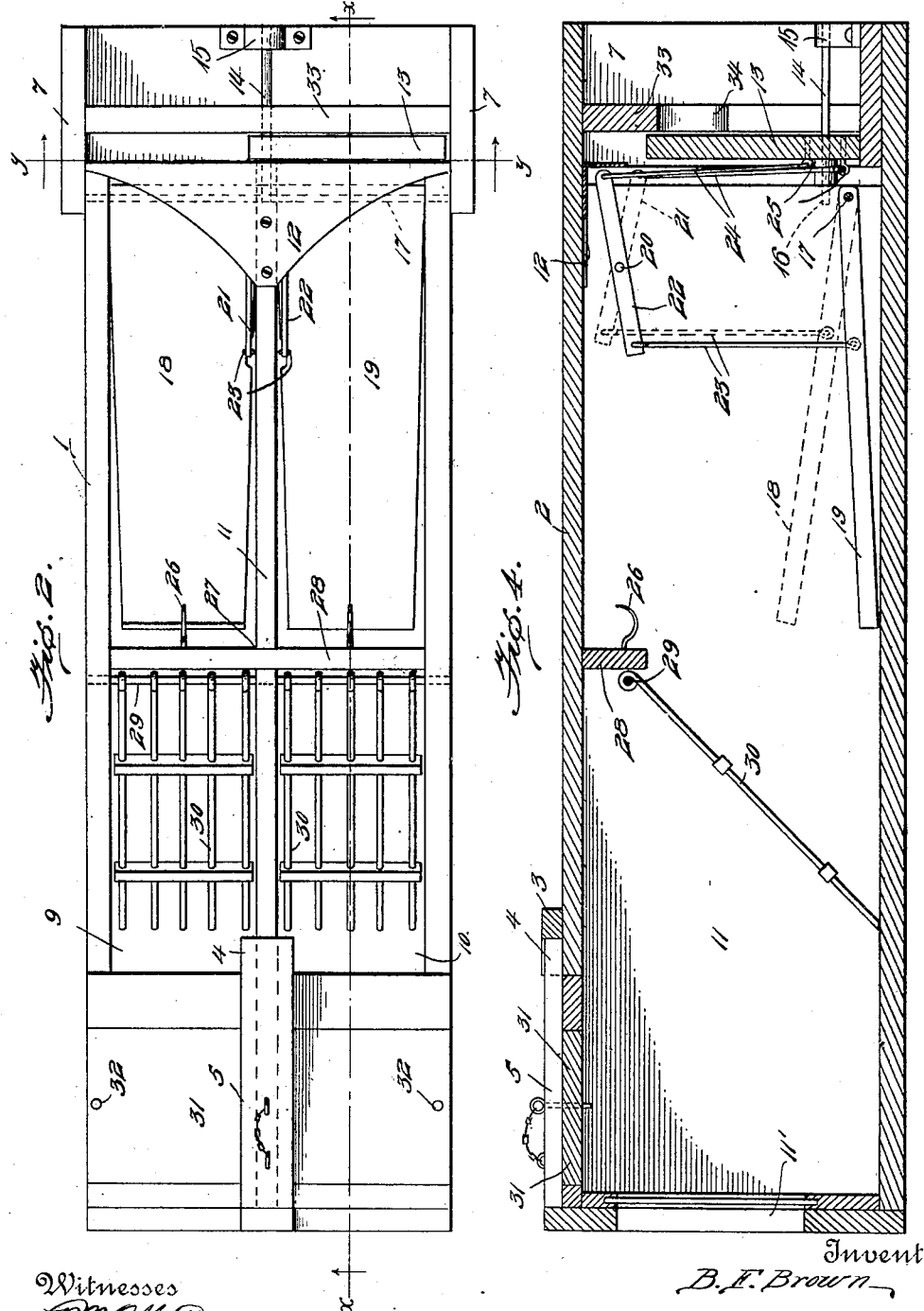

UNITED STATES PATENT OFFICE.

BENJAMIN F. BROWN, OF LITCHFIELD, ILLINOIS.

TRAP.

No. 891,666.  Specification of Letters Patent.  Patented June 23, 1908.

Application filed March 26, 1908. Serial No. 423,412.

*To all whom it may concern:*

Be it known that I, BENJAMIN F. BROWN, a citizen of the United States, residing at Litchfield, in the county of Montgomery and State of Illinois, have invented certain new and useful Improvements in Traps; and I do declare the following to be a full, clear, and exact description of the invention, such as will enable others skilled in the art to which it appertains to make and use the same.

My invention relates to animal traps and particularly to that type of trap known in the art as self-set ever-set traps.

It is the object of the invention to provide a trap of this character which when set will be re-set upon the opposite side by the entrance, or in other words by the catching of one animal.

A further object of the invention is the provision of means which is actuated by the weight of the animal to close the door of the compartment which he has entered, and to open the door of the compartment last occupied.

A still further object of the invention is to provide means for darkening that end of the compartment which has been entered by an animal, and to provide the opposite end of the trap with a barred window, which attracts the animal by the light given therethrough, and interposing between the dark end and the light end a swinging gate, which after being passed absolutely prevents the animal from going back into the door operating compartment.

With these and other objects in view, the invention consists of certain novel features of construction, combination and arrangement of parts, as will be more fully described and particularly pointed out in the appended claims.

In the accompanying drawings: Figure 1 is a perspective view, Fig. 2 a top plan view of the device with the cover removed, Fig. 3 is an end view, Fig. 4 is a longitudinal section on the line $x-x$ of Fig. 2, and Fig. 5 is a transverse section on the line $y-y$ of Fig. 2.

Referring more especially to the drawings, 1 represents a casing which is preferably oblong in shape, and which has its top side closed by a door 2, which may be removably engaged with the casing so as to obtain access to the rear end of the trap to inspect the working members, which will be hereinafter described.

A suitable cleat 3 is secured upon the forward end of the door and is notched to engage the overhanging end 4 of a bar 5, running longitudinally over a part of the top. The rear end of the cover 2 is provided with lugs 6, which are engaged with the upstanding edges of the door-jambs 7, to be hereinafter described.

The casing 1 is divided into two compartments, 9 and 10, by a partition 11, which extends longitudinally through the casing and forms a center dividing piece of a caged window 11′ in the front of the trap. The rear end of the partition 11 extends to a point approximately flush with the side piece of the casing, and connecting the partition and the side piece is an angular light shield 12, which overhangs the end edge of the partition and is arranged adjacent the door 13. This door is preferably rectangular in formation, and is pivoted upon a shaft 14, which passes through a bearing block 15, into a bearing socket 16, formed in the end of the partition, and through one corner of the door 13, in such a manner as to permit the door to swing from side to side through the arc of a circle whose axis is the central pivot shaft 14, and to present a flat edge to the bottom of the casing. The door is so arranged that when drawn to one side or the other its side edge is projected by the end of the side pieces of the casing which it overlaps.

Pivoted upon a transverse shaft 17 extending across the casing through the partition are a pair of treadles 18 and 19, one in each compartment 9 and 10 respectively adapted to act alternatively by the weight of the entering animals, as will be hereinafter described.

A stub shaft 20, is extended from the partition near its rear top edge, and journaled upon the shaft are a pair of levers 21 and 22, which are connected at their forward ends to the treadle by links 23. The rear ends are pivotally engaged with links 24, connected at their lower ends to projecting studs 25, secured on the opposite sides of the shaft 14. The weight of the animal as he enters either compartment 9 or 10 will act upon the treadle to close the door of that compartment behind him as the animal approaches the bait 26. The links 24 being crossed, the one connected to the lever 21 is pivoted to the stud 25 on the right hand side of the trap, while the link connected to the lever 22 is connected to the stud carried by the door on the left hand side of the trap.

The partition 11 is notched at 27 to accommodate a transverse supporting bar 28, which divides the compartments 9 and 10 into substantially four compartments, and at the same time supports the bait hooks 26. Immediately forward of the partition 28, I secure a transverse shaft 29, upon which I mount gravity gates 30, of any suitable material, but preferably of stiff wire prongs or tines, which are held together in spaced relation in any suitable manner.

In order to remove the game or other animals from the trap without removing the cover 2 I provide a sliding door 31, which slides upon the top of the casing and the partition and runs under the bar 5. This door is provided with upstanding lugs 32, one on either side thereof so as to engage the bar 5 and limit its movement in either direction so that it is impossible to lose game out of one side while removing it from the other. In order to make the rear of the trap as dark as possible I provide a shield 33, which is arranged between the sides on the jamb 7, and is provided with downwardly extending members 34, which prevent access of light to the trap.

In the operation of the device I will assume that the right hand compartment is set for operation. The animal passes from the threshold of the door and steps upon the treadle 19, when he gets close to the bait his weight depresses the treadle to throw the links and lever 22, and the door is thrown over to close the entrance to the compartment 10. This darkens the compartment and the animal goes forward until he passes under the gravity gate therein, and is thus caught. The lever 21 is at the same time operated to raise the treadle 18 in the compartment 9 so as to set that for a similar action. When this treadle is depressed by the weight of an animal the treadle in the compartment 10 is elevated again. Preferably the free end of the treadle never rests upon the bottom of the casing so that the weight of the animal holds the door closed.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention what I claim and desire to secure by Letters Patent is:—

1. In a device of the class described, a casing, a partition dividing said casing to form a pair of compartments, a door controlling said compartments alternately, a pair of levers pivoted upon said partition, a pair of treadles pivoted in the compartments, links connecting the treadles with the levers, and a connection between the opposite ends of the levers and the door which when the treadle in one compartment is depressed operates the door to close the entrance to that compartment and raises the treadle in the opposite compartment.

2. In a device of the class described, a casing, a partition dividing said casing into compartments, a swinging door for closing the entrance to each compartment alternately, means for automatically closing the door to one compartment, means for closing the door to the opposite compartment, a transverse partition in the casing arranged intermediate the length thereof, bait hooks carried by the transverse partition, gravity gates in each compartment, and a transversely reciprocating door covering the exit to both of said compartments.

3. In a trap, a body having a game chamber therein comprising a plurality of separated compartments, a door sliding transversely thereacross, means to limit the movement of the door so that only one compartment is uncovered at a time and means to lock the door in the intermediate position whereby both compartments are closed.

In testimony whereof I have hereunto set my hand in presence of two subscribing witnesses.

BENJAMIN F. BROWN.

Witnesses:
A. R. STANSIFER,
M. A. BROWN.